United States Patent
Harrison (10) Patent No.: US 6,292,748 B1
(45) Date of Patent: Sep. 18, 2001

(54) REDUCTION OF TIME ERROR IN GPS LOCALIZATION WITHOUT A HIGHLY ACCURATE CLOCK

(75) Inventor: Daniel David Harrison, Delanson, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/617,022

(22) Filed: Jul. 14, 2000

(51) Int. Cl.[7] .................................................. H04B 7/185
(52) U.S. Cl. ...................... 701/213; 701/214; 342/357.12
(58) Field of Search ..................................... 701/213, 214, 701/215; 342/357.01, 357.02, 357.03, 357.04, 357.12, 358, 357.16

(56) References Cited

U.S. PATENT DOCUMENTS

| 5,752,218 | 5/1998 | Harrison et al. | 701/207 |
| 5,955,986 | 9/1999 | Sullivan | 342/357.05 |
| 6,118,808 | * 9/2000 | Tienmann et al. | 375/210 |

* cited by examiner

*Primary Examiner*—Tan Nguyen
(74) *Attorney, Agent, or Firm*—Donald S. Ingraham; Donald E. Stoner (57) ABSTRACT

A method for minimizing time error uses a drift-susceptible time clock at the receiver carried by an asset to be tracked in a high-accuracy reduced-order GPS asset localization system. Long-term accuracy of the time clock is maintained by periodically re-synchronizing the clock with the master GPS time clock so that absolute asset time clock errors are kept below a known limit over the wide temperature ranges expected in the asset tracking application. This is accomplished with only a short GPS signal reception time; i.e., GPS frame synchronization and time-stamp decoding are not needed, and the asset position ambiguity associated with using GPS data-bit or code-bit edges as signal time references is eliminated.

10 Claims, 9 Drawing Sheets

REDUCTION OF TIME ERROR IN GPS LOCALIZATION WITHOUT A HIGHLY ACCURATE CLOCK

BACKGROUND OF THE INVENTION

This invention generally relates to asset tracking systems and, more particularly, to a method for lessening time error in a reduced-order Global Positioning System (GPS) localization system (i.e. one that does not calculate an accurate location at a tracked object) without requiring use of a highly accurate time clock.

Twenty-one Navstar GPS satellites in medium-altitude earth orbits make up the GPS satellite constellation. Signals transmitted from these satellites allow a receiver near the ground to accurately determine time and its own position. Each satellite transmits data that provide precise knowledge of the satellite position and allow measurement of the distance from that satellite to the antenna of the user's receiver. With this information from at least four GPS satellites, the user can compute its own position, velocity and time parameters through known triangular techniques (i.e. the navigation solution). Typically, seven, but a minimum of four, satellites are observable by a user anywhere on or near the surface of the earth if the antenna of the receiver operated by the user has an unobstructed view of the sky, down to very near the horizon. Each satellite transmits signals on two frequencies known as L1 (1.575.42 MHZ) and L2 (1277.6 MHZ) and all satellites share these frequencies using CDMA (code division multiple access) DSSS (direct sequence spread spectrum).

Each satellite transmits a single high-resolution DSS signal on frequency L2 and the same signal plus another lower-resolution DSSS signal on frequency L1. The low-resolution DSSS signal comprises a P/N (pseudo-random noise) code with a 1.023 MHZ chipping rate and a 1.0 ms repetition period, and a message data sequence (NAV data) with a rate of 50 bits per second. The high-resolution DSSS signal uses a P/N code with a 10.23 MHZ chipping rate and a repetition period longer than a week. The same NAV data stream is used in all DSSS signals from a given satellite. The NAV message from a given satellite contains the GPS signal transmission time, ephemeris (position) data for that satellite, almanac data (a reduced accuracy ephemeris) for all of the satellites in the constellation, and a hand-over word for use in connection with the transition from low-resolution to high-resolution code tracking. The low and high-resolution codes are known as the course/acquisition (C/A) and precise (P) codes, respectively.

After acquisition, the offset of each code, together with the signal-transmission time from the NAV data, enables a receiver to determine the range between the corresponding satellite and the user. By including both the P code and the repeating C/A code in the transmitted signal, a more-rapid hierarchical acquisition of the P code is made possible and a two tiered level of global navigation service can be provided. The P code can provide positions that are accurate to approximately 3 meters, while the C/A code yields accuracies on the order of 30 meters. Typically, the low-resolution service is unrestricted while the high-resolution service is restricted to the military by encrypting or otherwise controlling knowledge of the high-resolution P/N code.

Received GPS signals are usually shifted in frequency from the nominal L1 and L2 carrier frequencies because the GPS satellites move in orbit at several kilometers per second, yielding a substantial Doppler shift. The satellite trajectories are usually known a priori and the Doppler shifted carrier frequencies are therefore predictable if the GPS receiver location is known. However, the receiver location is not known a priori, and there is often substantial local oscillator error with inexpensive receivers. The resulting uncertainty in received carrier frequency (i.e., in needed replica carrier frequency) can be large (e.g., ±7.5 kHz), and this frequency range may have to be searched during the GPS signal-acquisition process. The frequency or Doppler search is usually done by repeating the cross-correlation of the received sample and local replica P/N sequences for different local oscillator (carrier replica) frequencies. The spacing between frequency steps is made small enough to avoid missing the signal when long cross-correlation integration times (narrow filter bandwidths) are used. Long integration times improve detection of low SNR (signal-to-noise ratio) signals. With typical civilian GPS applications, 1.0 millisecond cross-correlation integrations are used (a single C/A code cycle), yielding an equivalent Doppler filter bandwidth of approximately 500 Hz. A ±7.5 kHz frequency range can be searched with thirty 500 Hz steps. The GPS acquisition then entails a search over satellite code, code offset, and Doppler frequency.

A master control station (MCS) and a number of monitor stations comprise the control portion of the GPS. The monitor stations passively track all GPS satellite in view, collecting ranging data and satellite clock data from each satellite. This information is passed to the MCS where the future ephermeris and clock drift are predicted for the satellites. Updated ephemeris and clock data are uploaded to each satellite for re-transmission in each NAV message from each satellite.

In operation, a typical GPS receiver performs the following for each of at least four satellite signals:

1) acquires the DSSS signal
2) synchronizes with the NAV data steam and reads the satellite time-stamp, clock-correction, ionospheric-delay and ephermeris data,
3) calculates the satellite position from the ephemeris data,
4) reads its own receiver clock to determine the receiver time associated with reception of the time-stamp epoch, and
5) estimates the signal travel time by subtracting the time-stamp value from the associated receiver time.

This time difference is multiplied by the speed of light to obtain an estimated range to the satellite. If the GPS receiver clock were perfectly synchronized with the clocks of the satellites (or the error were known), only three such range estimates would be required to precisely locate the receiver. There is, however, a clock-bias (slowly changing error) due the fact that the satellites are equipped with atomic clocks while the GEPS receivers typically use less accurate locks. This clock bias is learned and its effect eliminated by measuring the range (travel time) from four GPS satellites and using these measurements in a system of four equations with four unknowns (receiver x, y and z, and time).

In an application of the invention, assets such as railcars, shipping or cargo containers, trucks, truck trailers, and the like are located and tracked by using the GPS. In asset tracking, the GPS receivers are usually battery powered since an independent source of power is generally not available. It is advantageous to increase the operating life of the batteries by reducing the energy consumed by the GPS receiver.

In a typical GPS receiver, the receiver front end (i.e. radio frequency, (RF) and intermediate frequency (IF) electronics)

consumes a large amount of power while it is turned on. This results in high energy consumption if the signal acquisition and synchronization are not quickly accomplished. Most GPS receivers do not have signal storage (memory) and must process the received signals in real time. Such receivers use either a sequential search or search a small number of satellite/code-offset/Doppler (SCD) bins simultaneously to achieve signal acquisition. These receivers must continually receive and process each satellite signal until the SCD bin for that signal is identified and the necessary NAV data are decoded.

In a system where a central facility or station must keep track of multiple assets (e.g. railcars), each tracked object may carry a GPS receiver that processes data from several of the visible GPS satellites; often, however, an accurate position determination is not made at the receiver. Instead, only partial processing is done at the receiver and intermediate results are transmitted from the asset to the central station. These intermediate results do not necessarily require decoding of navigational or other data from the GPS signals, and thus may allow the GPS receiver and signal processor to be powered only long enough to acquire the satellite signals (i.e. determine the SCD bins). In such system, the dominant energy consumption occurs in the acquisition process, and the GPS receiver energy expended at each tracked asset can be dramatically reduced if the signal acquisition time and energy are dramatically reduced. To accomplish this result, however, an accurate (and hence, expensive) time clock would be needed at the asset in order to avoid substantial location errors. It would thus be desirable to provide a method for reducing time error at the tracked GPS receiver in a reduced-order GPS localization system while using a drift-susceptible time clock.

BRIEF SUMMARY OF THE INVENTION

In a preferred embodiment of the invention, a high-accuracy asset localization system employs, on each respective asset, an inexpensive time clock of less accuracy than an atomic clock. Long-term accuracy of these time clocks, which are predisposed to drift, is increased by periodically re-synchronizing the clocks with the master GPS time clock so that absolute asset time clock errors are kept below a predetermined limit. This is important because clocks that are accurate over the wide temperature ranges encountered in asset tracking operation are expensive. Furthermore, clock re-synchronization is accomplished in only a short GPS signal reception time since GPS frame synchronization and time-stamp decoding are not needed. This also benefits other functions (e.g. communication with the central tracking facility ) that require accurate time-keeping at the asset for the energy-efficient operation, and reduces the asset position ambiguity associated with using GPS data-bit or code-bit edges as signal time references.

DETAILED DESCRIPTION OF THE PREFERRED EMBODIMENTS

Figure 1:
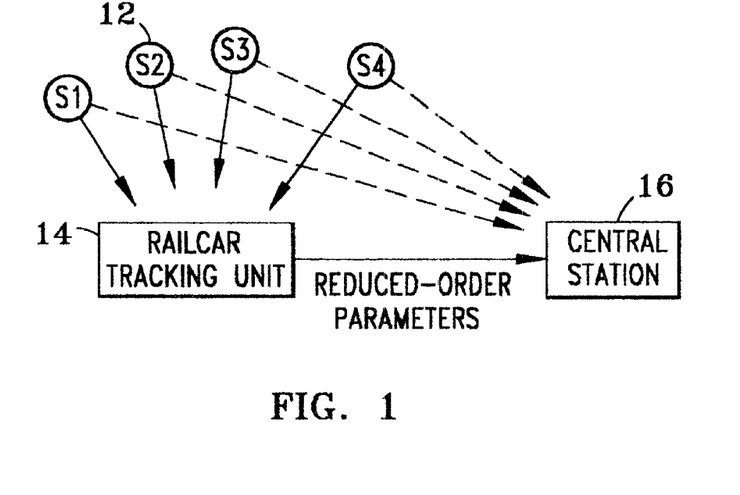
FIG. 1 is a block diagram of a remote tracking system employing the invention.

FIG. 1 illustrates a plurality of GPS satellites 12, an object being tracked (asset), such as a railcar carrying a tracking unit 14, and a central station 16. Each satellite 12 transmits a signal that a GPS receiver in tracking unit 14 uses to measure the propagation delay (and delay rate, if asset velocity is desired) from that satellite to the receiver antenna. The satellite signals also include the periodically repeating NAV data needed to determine a navigation solution from the measured time delays. Because of the low rate (50 bits/second) of the NAV data in the GPS signal, a tracking unit receiver must be active for a substantial period of time (approximately one minute) if the NAV data are to be collected. Furthermore, transmitted NAV data should reflect changes in GPS satellite orbits over time. The GPS MCS monitors these changes and provides nearly hourly updates to the NAV data. To insure accurate navigation solutions, any GPS based navigation system must use NAV data that are no more than about four hours old. If the asset positions are to be monitored more frequently than every four hours then new NAV data must be collected at least every four hours. NAV data maintenance then requires an approximate average of fifteen seconds of receiver operation per hour, which entails a significant energy expenditure if the receiver at each tracked asset operates on this schedule.

In a preferred embodiment of the invention, the navigation solution is not calculated at the asset but is instead calculated at the central station. None of the NAV data are needed at the tracked asset; instead, only data relating to the GPS signal propagation delay between each satellite and the asset need be measured at the asset, and these data are then sent to the central station. In practicing the invention, the NAV data can be determined at central station 16 by utilizing a standard GPS receiver at the central station, or by communicating with an appropriately located standard GPS receiver. If desired, the NAV data, or the navigation solutions, may be communicated to the tracked assets via a higher rate communication link that would require less energy to receive the data at the asset.

Figure 2:
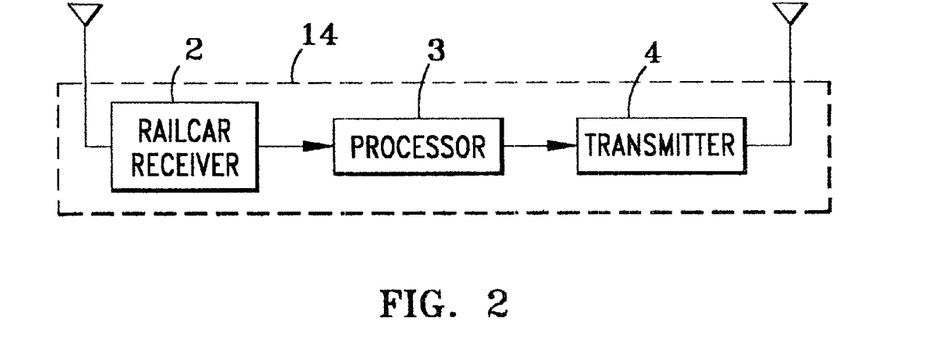
FIG. 2 is a block diagram of a tracking unit on an object to be tracked in the remote tracking system of FIG. 1.

As shown in FIG. 2, a railcar tracking unit 14 is comprised of a receiver 2 responsive to the signals from GPS satellites 12 (FIG. 1), a processor 3, and a transmitter 4. The received signals are processed in processor 3 to ascertain and utilize propagation time differences among the signals received from the GPS satellites. By utilizing time differences, the need for knowledge of the GPS signal time-stamps at the asset is alleviated, and data stream decoding is therefore unnecessary at the asset. With no need for GPS data stream decoding, the receiver processing reduces to calculating the relevant time differences (and Doppler frequency differences, if asset velocities are to be determined) from the acquired GPS signals. The calculated time differences, and data identifying the satellites associated with the differences, are transmitted by transmitter 4 to central station 16 (FIG. 1). A description of the centralized tracking system in which GPS signal acquisition is a major part of the assets' GPS energy budget is found in commonly assigned Harrison, Pradeep, Brooksby and Hladik U.S. Pat. No. 5,752,218, issued May 12, 1998, which, is hereby incorporated by reference.

Figure 3:
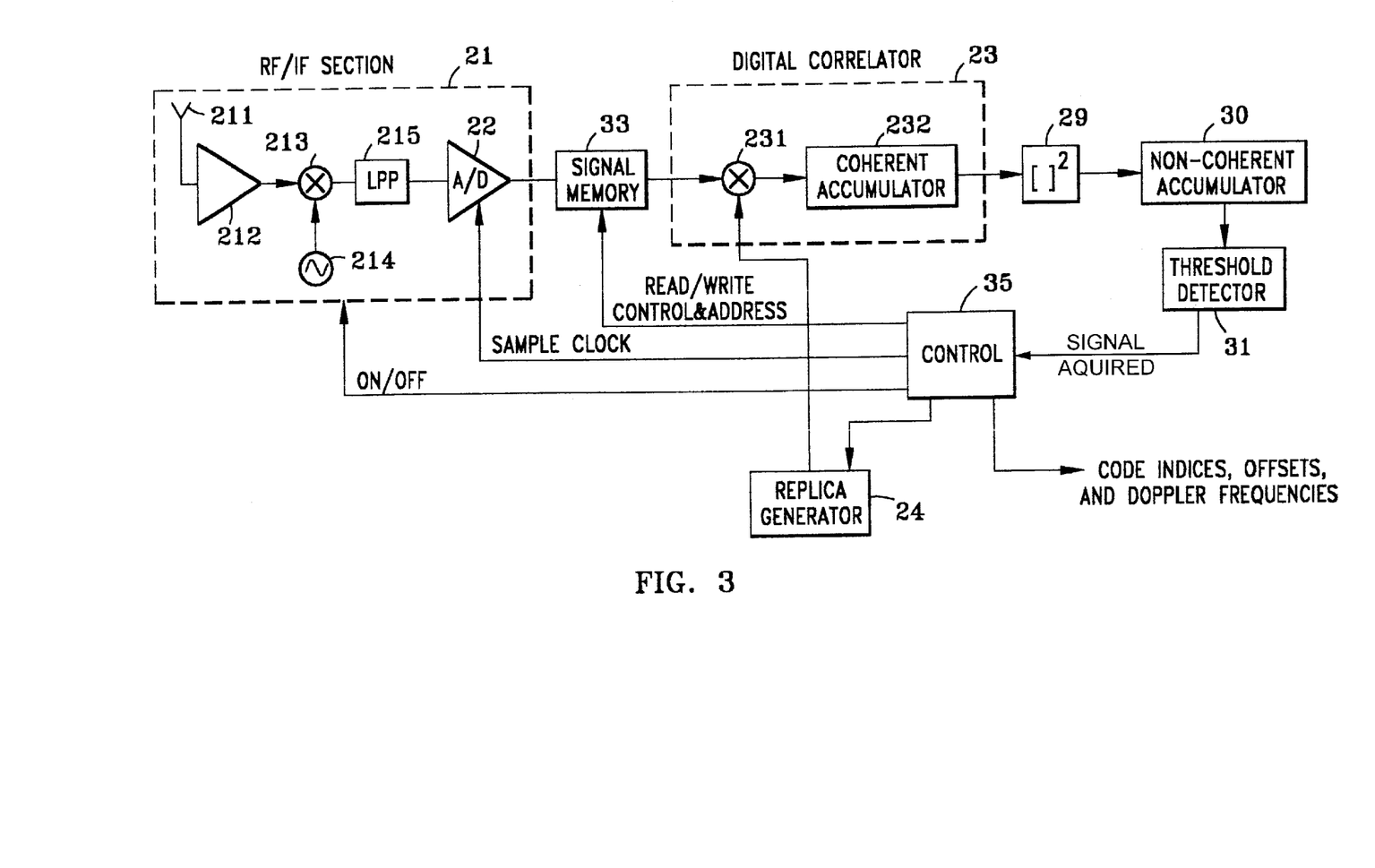
FIG. 3 is a block diagram of a sequential signal processing system in which the present invention may be implemented.

FIG. 3 shows a serial acquisition GPS receiver in which the present invention may be implemented. In a conventional GPS receiver, signal acquisition is followed by carrier and binary pseudo-random noise (P/N) code synchronization, and NAV data demodulation, but modules for these processes are not employed in the GPS receiver shown in FIG. 3. The signal acquisition architecture comprises an RF/IF (radio frequency/intermediate frequency) section 21 including an antenna 211, an RF amplifier 212, a mixer 213 and local oscillator 214, and a low pass filter 215 which provides a received and down-converted output signal to an analog-to-digital (A/D) converter 22 running at an integer multiple of the code chip rate. A/D converter 22 samples and converts to digital format at an integer multiple of the replica C/A code chip rate and supplies a digital sequence to a serial digital correlator 23 through a signal memory 33. Correlator 23 serially computes the inner product of a digitized receiver output sub-sequence signal from A/D converter 22 and a C/A replica code sub-sequence signal from a replica generator 24. The inner product is performed serially by first multiplying the first terms of the two sub-sequences in a multiplier 231 and storing the result in a coherent accumulator 232, then multiplying the second terms of the two sub-sequences and adding this result to coherent accumulator 232, etc. The inner product is performed in real time as sub-sequence terms become available from AID converter 22. As is conventional, the sub-sequences usually span a single period of the repeating C/A code. After an inner product has been computed, the coherent accumulator contains a sample of the cross correlation of the received sub-sequence with one C/A code cycle of the replica signal, for the particular C/A code, code-offset and Doppler frequency generated by the replica generator. The inner product operation is repeated with several following sub-sequences from A/D converter 22 while using the same replica C/A code sub-sequence. The subsequent inner product results are squared by a squarer 29 and summed in a non-coherent accumulator 30, yielding a non-coherent integration of the coherent processing results. The output signal of non-coherent accumulator 30 is examined at a threshold detector 31 and a "signal acquired" command is generated if the signal level in non-coherent accumulator 30 is sufficiently high. When a signal has been acquired, a control 35 notes the associated C/A code index (satellite index), code offset, and Doppler frequency to be provided, and commands replica generator 24 to either change to a different C/A code (for a different GPS satellite) and begin another search, or to stop if sufficient signals have been acquired. If a signal has not been acquired after the several sub-sequences from A/D converter 22 have been processed, then control 35 commands replica generator 24 to change to a different C/A code, code offset, and Doppler frequency. As each satellite signal is acquired, control 35 provides the associated code index, code offset and Doppler frequency to GPS signal synchronization and NAV data processing units (not shown).

Provision for searching all feasible C/A codes, code offsets and Doppler frequencies is provided. Control 35 selects the desired C/A code and code offset through commands to the replica generator. To insure detection of the GPS signal, the RF/IF section must generate both an in-phase (I) and quadrature (Q) output signal (not shown in FIG. 3) which must be processed for signal acquisition. Furthermore, each of the I and Q RF/IF output signals must be processed with both the I and Q Doppler sinusoidal components, as is known by those skilled in the GPS art.

Conventional GPS receivers require the receiver output data from RF/IF section 21 to be processed as soon as they are available, and processing is constrained by the code rate in the received signal. The system according to one aspect of the invention, as shown in FIG. 3, includes signal-storage memory 33, and power to RF/IF section 21 is controlled by control 35. The GPS signal provided from RF/IF section 21 is converted to digital format by A/D converter 22 as previously mentioned, but the A/D sampling rate may be set by control 35 to a low non-integer multiple of the C/A code rate. Memory 33 stores a length of input signal sufficient for signal acquisition and allows the RF/IF section to be turned off after storage. As a result, acquisition processing is no longer constrained by the code rate of the received signal, as in the prior art. The non-integer A/D sampling rate allows accurate determination of GPS signal propagation time differences, needed for centralized tracking, without the conventional carrier and PIN code synchronization processes. This architecture allows RF/IF section 21 to be turned off after storing just enough received signal for accurate acquisition.

With the GPS, as in most DSSS systems, the SNR is very low before signal processing, and a substantial period of the received signal must be processed to yield the high SNR correlation peak needed for reliable signal detection by threshold detector 31. For normal civilian GPS applications, approximately 20 ms of signal from RF/IF section 21 must be stored and processed. To keep the memory size small, the signal from RF/IF section 21 is sampled at a low rate and is quantized to only a few levels. For civilian applications, conventional GPS receivers typically achieve a GPS fix (location) accuracy of 30 meters. GPS fixes with this accuracy can be calculated from signal code offsets that are measured with an error of less than one tenth of a C/A code chip. The signal code offset is measured by noting the replica-signal code offset associated with the cross-correlation peak. In one embodiment of the invention, a sequence of results from non-coherent accumulator 30 is generated in order of increasing replica code-offset while holding the code index and Doppler frequency constant. If a large correlation result is observed, an interpolation algorithm is applied to the sequence of results and the code-offset associated with the correlation peak is estimated. A code-offset accuracy of one-tenth of a code chip is achieved when sampling the signal at approximately twice the C/A code chip rate. Conventional GPS receivers do not achieve the desired one-tenth chip accuracy during signal acquisition, but do so during code synchronization by sampling the signal at twice the C/A code chip rate and tuning the sampling phase as part of the early-late delay-locked loop.

The SNR at the input to A/D converter 22 is well below zero, so little signal degradation is suffered when the A/D converter uses just three appropriately chosen representation levels. Each sample can be conveniently encoded in sign-magnitude format using only two data bits. To insure signal detection, both I and Q RF/IF output signals must be generated, stored, and processed (only one RF/IF channel is shown in FIG. 3). With 1023 C/A code chips per millisecond and both I and Q RF/IF signals being sampled at approximately two samples per code chip with two bits per sample, approximately 170,000 bits of storage are required for the 20-ms signal segment. For convenience, the I and Q data can be considered as stored in separate I and Q memories.

When the required data have been sampled, converted, and stored, the receiver can be turned off and the recorded data can be processed. In the sequential search of SCD bins, the stored data are replayed (read) once during the correlation process for each combination of code, code offset, and Doppler shift. In the system of FIG. 3, the sequence of stored digital data samples is read from memory 33, one sample at a time. Each sample of the sequence from memory 33 is multiplied in multiplier 231 by the corresponding sample of the sequence from replica generator 24, and the result is stored in coherent accumulator 232. The sequence from the replica generator is crafted for a particular code, code offset, and Doppler frequency under test. The length of the memory sequence so processed is the coherent integration length, and is typically chosen as one full cycle of the C/A code, which is 1.0 milliseconds. Several (e.g. twenty) adjacent 1.0 millisecond memory segments are processed in this manner without changing the replica sequence. After each 1.0 millisecond segment is processed, the value stored in coherent accumulator 232 represents the cross correlation between the 1.0 ms replica data sequences. This value is squared by squarer 29 and added to non-coherent accumulator 30. Before the first 1.0 ms segment is processed for a given replica signal, non-coherent accumulator 30 is reset to zero so that the final accumulated result represents the total correlation score for the particular code, code offset, and Doppler frequency specified by the replica signal. Similarly, the coherent accumulator is reset before each 1.0 ms segment is processed. Threshold detector 31 monitors the correlation score and provides a "signal acquired" signal if the score is larger than a specified threshold. Upon receipt of a "signal acquired" signal, control 35 performs a simple peak-search and interpolation algorithm to find the best estimate of the code offset associated with the given code index and Doppler frequency under examination. Control 35 then selects another code, code-offset, and Doppler frequency combination and commands replica generator 24 to alter the replica signal to reflect this change. The signal acquisition process is repeated for multiple replica signals corresponding to the codes, code offsets, and Doppler frequencies to be searched, and is stopped when the desired number of GPS signals (different C/A codes) have been acquired. Control 35 then produces the code indices, estimated offsets and Doppler frequencies associated with the acquired signals.

The I and Q memory data can be processed sequentially, (e.g., process all I data, then process all Q data) using one digital correlator 23 as shown in FIG. 3. Alternatively, the I and Q memory data can be processed simultaneously using separate digital correlators. In any event to insure signal acquisition I and Q Doppler processing must be performed on both the I memory data, and the Q memory data. Thus there are four I-Q combinations and they can be processed sequentially or simultaneously.

The acquisition search is conveniently performed by first selecting a code and a Doppler frequency, and then indexing through different code offsets. Then the Doppler frequency is changed and the different code offsets are re-examined. Non-coherent accumulator 30 can be implemented as an array of accumulators, one for each candidate code offset in a sequence of adjacent offsets. This accumulator organization allows the scores for adjacent offsets to be simultaneously examined so that an interpolation algorithm can be applied to find the sub-chip offset value associated with the actual score peak.

In a preferred embodiment of the invention, accurate synchronization of time clocks at assets that are being tracked is provided, even with asset clocks that drift by up to ±0.3 seconds between re-synchronization epochs. The GPS data stream has periodic correlation (every 30 bits, induced by the standard error-detection coding), and in this embodiment, this periodic correlation is used to establish an intermediate time grid with which all asset measurements and clock synchronizations are subsequently aligned. The central station and asset both keep track of the absolute bit count (K) and time associated with each intermediate grid point. By allowing the reduced-order GPS (ROGPS) measurements to be made only at the established intermediate grid points, the central station can ascertain the correct time and satellite positions associated with the measurements, and correct asset positions can again be calculated. Now, however, the asset clock can drift by up to one-half of the intermediate grid spacing without the asset signal processing system losing track of the absolute bit count.

For a given drift rate, the asset receiver can now remain inactive for an extended time and still correctly reacquire synchronization when it again becomes active. As an example, an inexpensive asset clock that may have accuracy (unknown to the asset) of $10^{-5}$ seconds per second will drift ±0.3 seconds in $3 \times 10^4$ seconds or 8.33 hours. If the clock is not re-synchronized within this period, the correct bit count will be lost and asset time and position ambiguities will result. The asset must therefore again acquire clock synchronization in some other way; e.g.; by decoding time from the GPS data stream as mentioned above.

In aligning the asset clock with the received GPS signal time grid, an offset from true GPS time will result, due to the propagation delay from the GPS satellite to the asset receiver. However, this delay is bounded between 58.5 ms and 79.9 ms. If the delay is always assumed to be an average, or (58.5+79.9)/2=69.2 ms, and this is accounted for in the synchronization process (i.e., subtracted from the received reference), then the clock will be in error by, at most, (79.9−58.5)/2=10.7 ms immediately after re-synchronization. This does not directly affect the location accuracy; however, the allowed drift period must be reduced to account for this initial (possible) error. While this error is only a small part of the allowable 300 ms drift, it may still be too large for some applications. In that event the ROGPS system can be modified so that the actual propagation delay for each GPS signal is estimated at the asset after the asset has calculated its own position.

Figure 4:
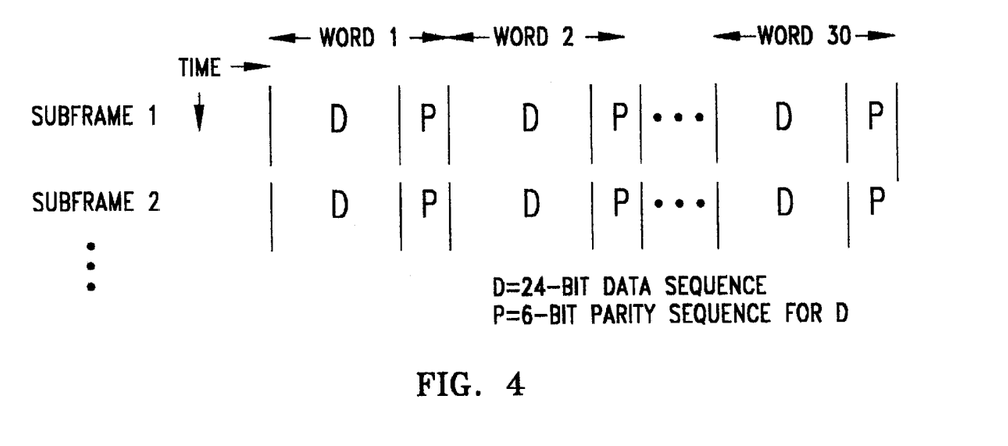
FIG. 4 is a framing diagram illustrating the GPS signal data format.

FIG. 4 shows the data format for a GPS signal. The data rate is 50 bits per second and the data are segmented into 300-bit sub-frames. Each sub-frame comprises ten 30-bit data words, with the first 24 bits of each word being data and the final 6 bits being parity generated from that data. While the data are different in different sub-frames, the word and parity organization is constant and periodic. In the process of performing asset clock synchronization, word markers are derived from the data stream using the method described below, and these markers define the intermediate time grid mentioned above.

When an asset receiver has been inactive long enough for the time clock to have drifted by, for example, 0.25 seconds relative to true time, this drift is immediately eliminated upon acquisition of any GPS data stream by resynchronizing the asset clock using the received word boundary markers. Accurate resynchronization is possible because the time associated with each data word boundary is known a priori at both the central station and the asset and because the asset clock is accurate enough to correctly count the passage of whole data words, even when the receiver is inactive. For each GPS satellite, the transmission time associated with a word edge (i.e., the first bit) is given by $$t_a = t_s + KT_w \quad (1)$$

where $t_s$ is the time of a reference word edge and $T_w$ is the known word period (30×20 ms=0.6 s). Additionally, K is the index of the present word relative to the reference word, with the reference word index being zero. At the asset or central station, K is readily determined from the present clock reading, t, from $$K = \left[\frac{t - t_s}{T_w} + 0.5\right] \quad (2)$$

where the brackets indicate the integer part. At the asset, t can be in error by up to $T_w/2$ seconds and K will still be correctly indicated. This K is then used in equation (1) to obtain the correct time to assign to the asset clock for the instant when the beginning of word K is received. The asset clock will then be in error by the propagation time associated with signal travel from the GPS satellite to the receiver. This error is small (less than 100 ms). Furthermore, this time error will cause no error in calculated asset position if the position-calculation uses the GPS transmission time (not the reception time) associated with any chosen point in the received sequences. The value of $t_s$ can be made available to all tracked assets either a priori (by storing it in a memory) or by occasionally transmitting it (via a communication channel) as part of an auxiliary GPS data set.

Figure 5:
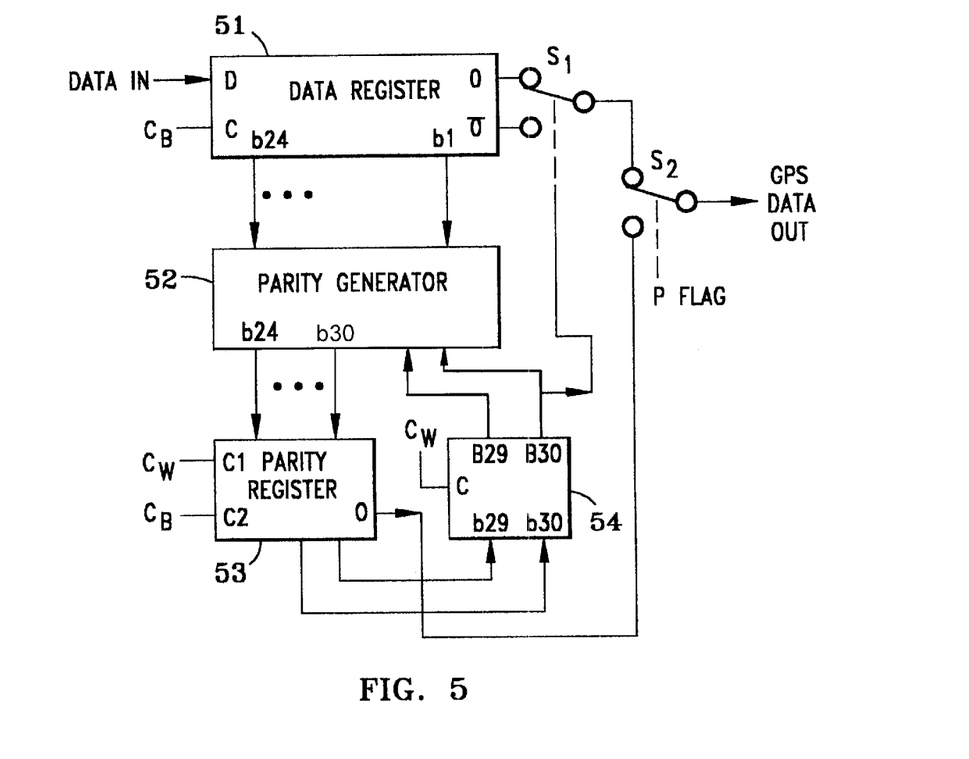
FIG. 5 is a block diagram of the standard data encoding process used either at a GPS satellite or at the ground station originating the GPS data.

FIG. 5 illustrates a data encoder used at either the GPS satellite or the ground station originating the data. This encoder generates data in the GPS format shown in FIG. 4. As shown in FIG. 5, uncoded data enter a data shift register 51 one bit at a time in synchronism with a bit clock $C_B$. After 24 uncoded bits have entered register 51, 6 parity bits are generated by a parity generator 52 and latched (in parallel) into a parity register 53 by a word clock $C_W$. Simultaneously, bits b29 and b30 are latched into a carry register 54 for use in encoding the next data word. The output word is then formed by first shifting the 24 bits out of data register 51, and then shifting the 6 parity bits out of parity register 53 (P-flag goes high and sets a switch $S_2$ to the parity register output). The 24 bits are inverted if output B30 (from the previous encoded word) is true.

Figure 6:
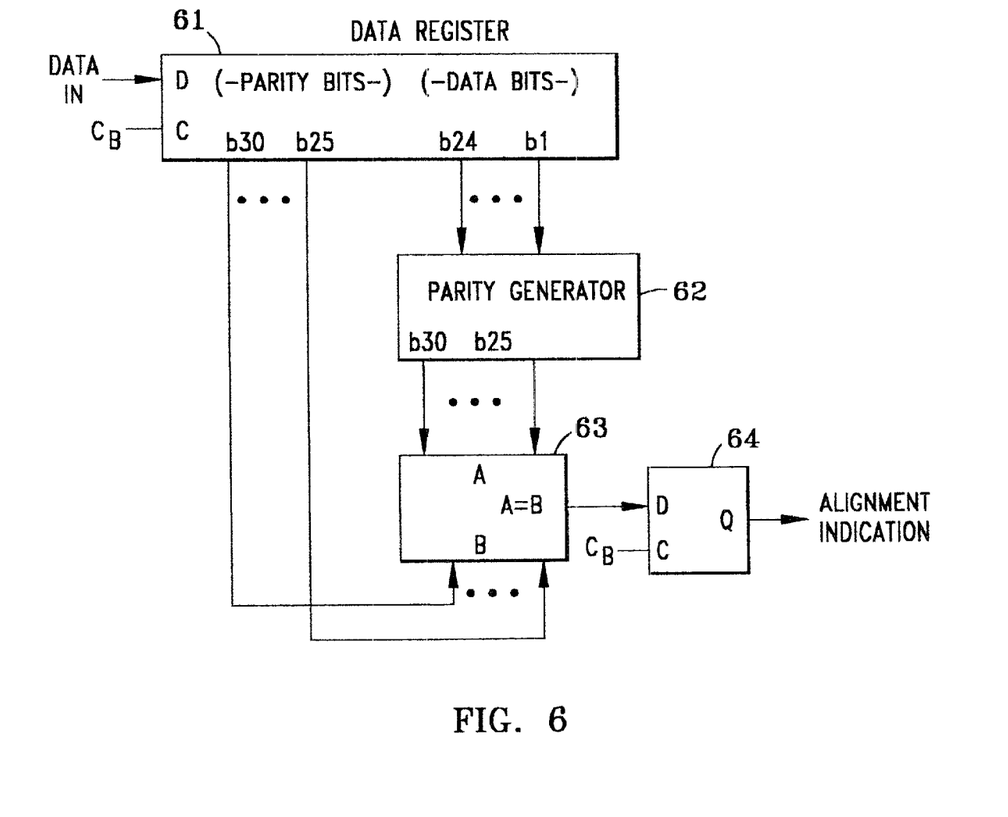
FIG. 6 is a block diagram of a word alignment detector used at the asset to identify word edges.

FIG. 6 illustrates a word alignment detector used at the asset to identify word edges. Data from the received GPS data stream are clocked into a data shift register 61 serially, one bit at a time. After each new bit is received, the output signal of a parity generator 62 is compared, by a comparator 63, to the parity bits assumed to be stored in shift register 61. If these parity word segments are equal, a word alignment detector 64 becomes true for that bit period, indicating that the last bit to enter shift register 61 is the end of a 30-bit data word. While FIG. 6 shows a hardware implementation, a software or microprocessor implementation may be readily designed by one skilled in the art.

Figure 7:
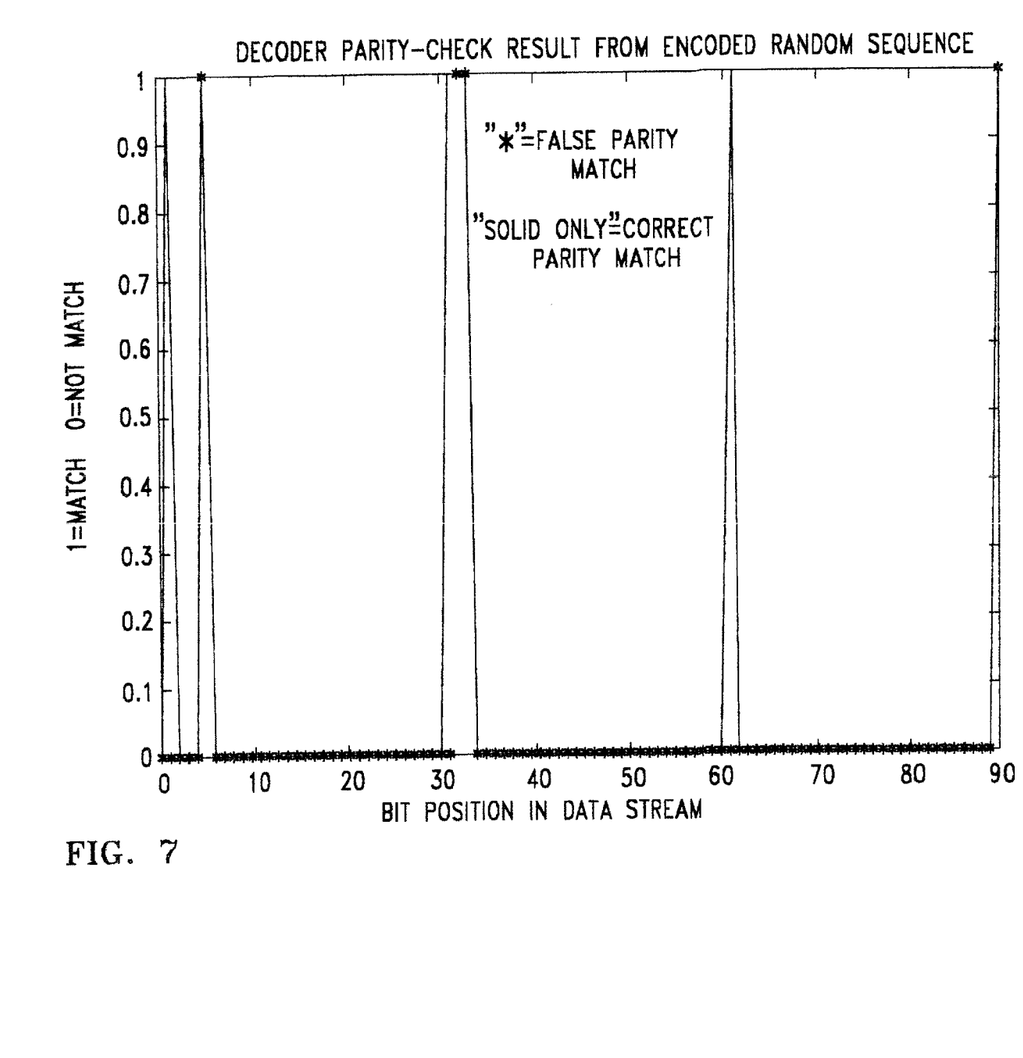
FIG. 7 is a timing diagram illustrating the alignment detector output signal.

Word alignment detector 64 produces a true output signal for any 30-bit data sub-sequence for which the assumed parity sub-sequence is properly related to the assumed data sub-sequence, i.e. for a parity match. This occurs when a true 30-bit word is aligned in the shift register, assuming that no bits have been corrupted by channel errors. However, an indication will also occasionally occur due to the random nature of the data stream, so that the true periodic alignment indications are interleaved with random false alignment detections. This is demonstrated in the timing diagram of FIG. 7, which shows a 90-bit sub-sequence that appears at the output of a word alignment detector driven with data from an encoder that has encoded a long random binary sequence. The solid curve shows both correct and false detections while the asterisks (*) show only the false ones. These are simulation results.

To avoid incorrect asset clock synchronization, the false alignment indications must be identified and eliminated. Most false indications can be eliminated by requiring that any accepted indication be exactly 30 bits after an earlier indication. However, it is also possible to get a pair of false indications that are spaced 30 bits apart. If this random event occurs, there will be a correct indication between the false ones (unless there were channel errors) and the fact that there are multiple indications in a single 30-bit interval can be used to hold off the alignment decision process.

Figure 8:
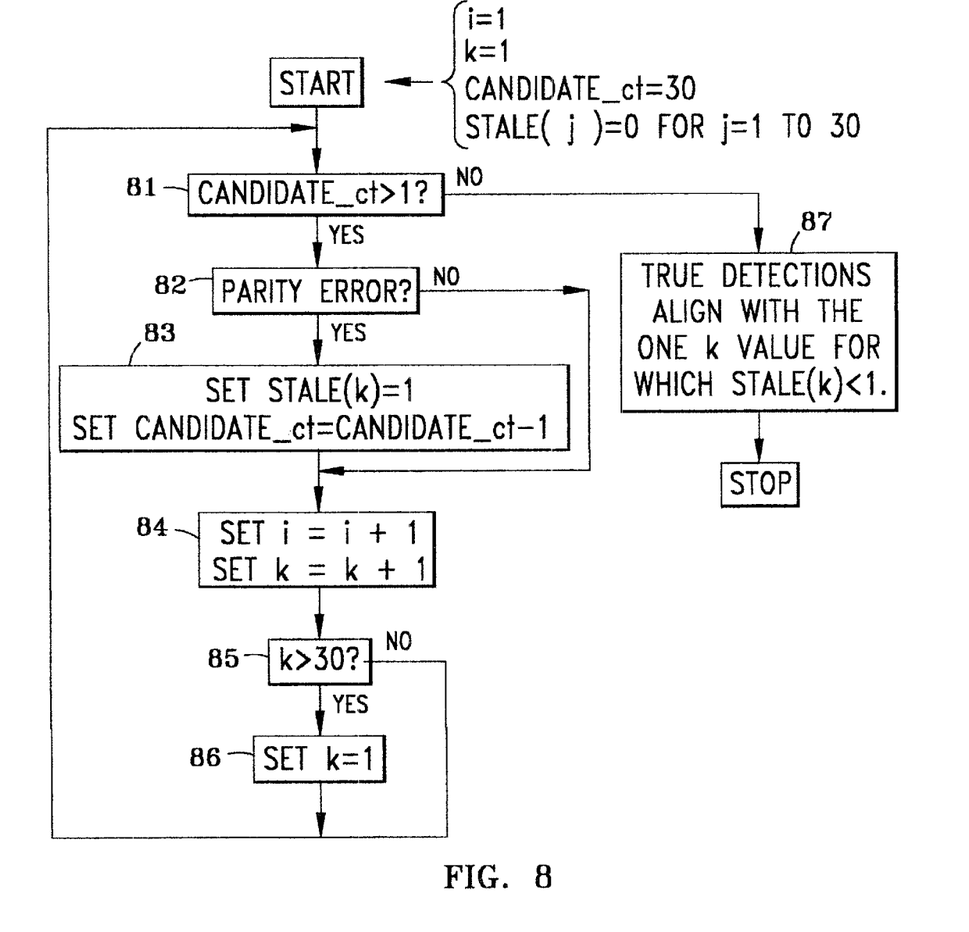
FIG. 8 is a flow diagram showing the logic of the implemented correct-alignment detection algorithm.

A specific software implementation of the algorithm for identifying the correct alignment indications is shown in FIG. 8. This algorithm will work well when there are no data-bit errors. The process starts at any chosen bit in the GPS data stream. This bit is labeled as bit 1. Starting at this bit (which is i=1), the first 30 bits of the received data bit sequence are examined by an alignment (parity) detector for an alignment indication (i.e., a parity match). Then the examination is repeated for the 30 bits starting at bit 2 (which is i=2), then bit 3, and so on until a unique correct alignment grid is established.

With 30-bit words, there are only 30 possible word alignment grids, and these grids are indexed by k=1 through 30. At the start, all 30 candidate grids are possible, and 30 "stale" indications are set to false (or 0). Also, bit position indicator i is set to 1 and grid index k is set to 1. The number of candidates, designated candidate-ct, is set to 30. When a 30-bit data sub-sequence is examined for a parity match (i.e., an alignment detection), the corresponding grid (k) can be set to stale (i.e., be eliminated) if the calculated parity does not match the received parity. As each grid (k) is eliminated, the candidate count is decreased by one. When there is only one grid (k) left that is not stale, that bit position aligns with the word boundaries in the data stream.

Following the flow diagram of FIG. 8, a test is made at a decision step 81 to determine if the candidate count is greater than one. If so, a test is made at decision step 82 to determine if received parity matches calculated parity. If so, stale (k) is set to 1 and candidate$_{13}$ct is decremented by 1 at step 83 and the process goes to step 84 where both i and k are incremented by 1. If not, the process goes directly to step 84. Next, at step 85, a test is made to determine if k is greater than 30. If so, k is set to 1 at step 86 and the process then loops back to decision step 81. If not, the process skips step 86 and loops back to decision step 81. When the candidate count is not greater than one, the process advances to step 87, where true detections are accepted as aligning with the one value of k for which stale (k)<1.

The above process description assumes that no channel errors occur that would cause true alignment indications to be missed. To allow for channel errors, a candidate grid should not be eliminated if just one match is missed at that grid location (k). In general, the data sequence must be examined long enough for one candidate grid to become the obvious grid. This may never occur if the channel error rate for the given GPS satellite is very high. However, this is not a problem because the error rate is low if the received signal to noise ratio (SNR) is high. If the SNR is low, a different satellite should be used.

Figure 9:
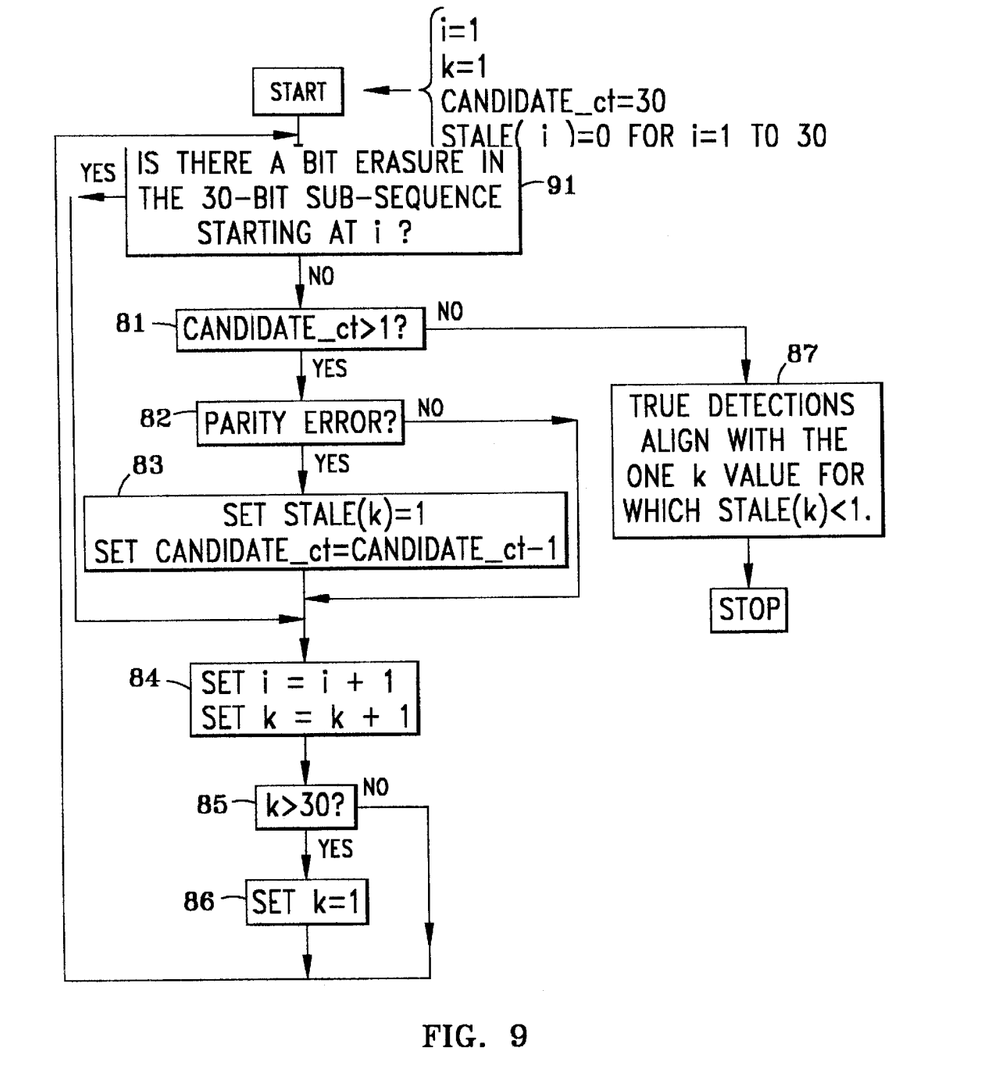
FIG. 9 is a flow diagram showing the logic of a modification of the implemented correct-alignment detection algorithm.

It is possible that the SNR associated with a particular satellite will occasionally dip due to fading. This can cause some bits to be erased if they are uncertain at the receiver detector. These erasures can be detected in the receiver since the received energy drops during these periods. The process of FIG. 8 can be modified as shown in FIG. 9 to monitor these erasures and prevent elimination of any candidate grid if there is a bit erasure within the 30-bit sub-sequence being examined. Specifically, the processing loop is modified by adding an initial test at decision step 91 to determine if there is a bit erasure in the 30-bit sub-sequence starting at i. If so, the process skips to step 84, and processing continues from there; otherwise, the process moves to step 81 and processing continues from there. With this improved process, the effect of erasures is to increase the time needed to determine the true word boundary grid.

Figure 10:
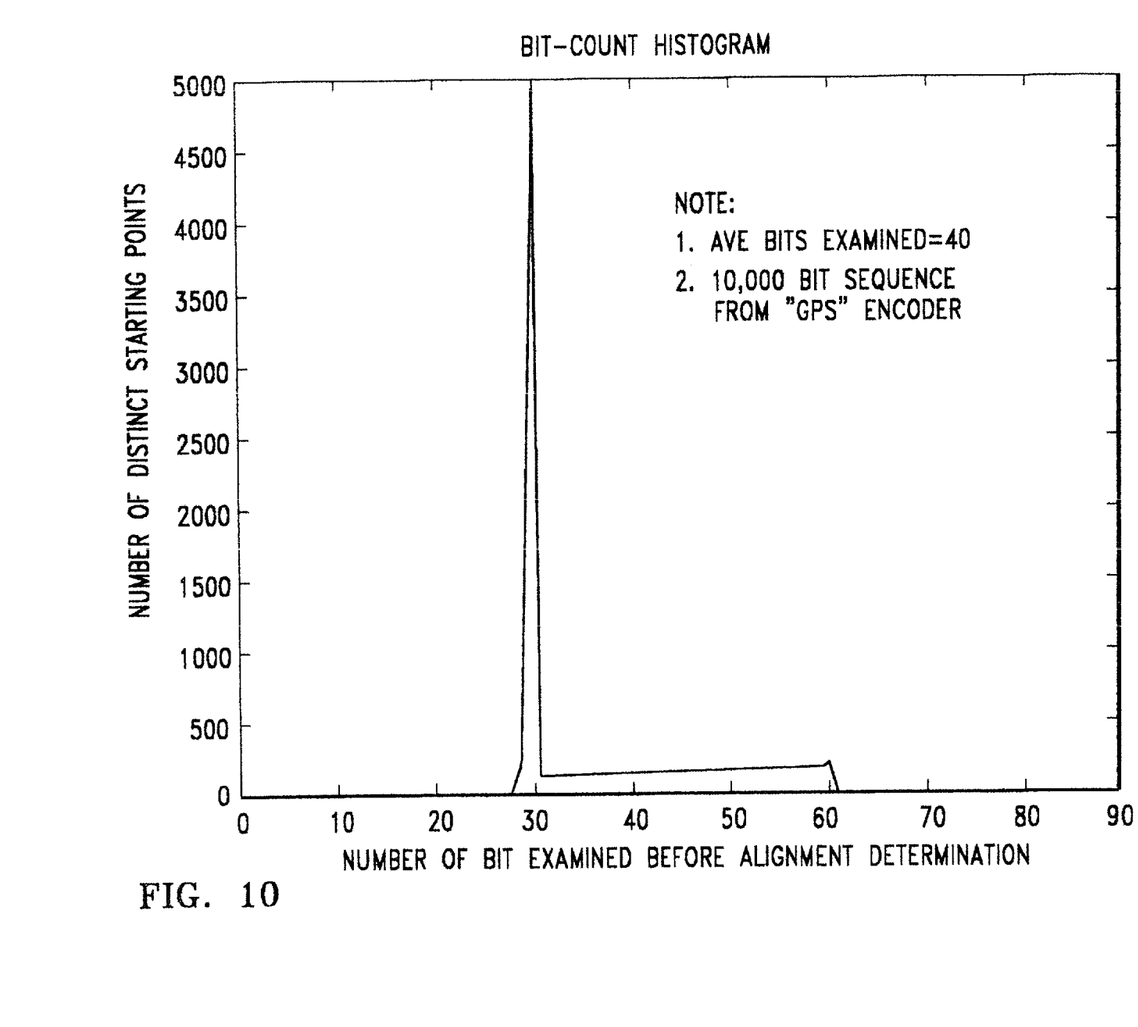
FIG. 10 is a histogram of the number of bits examined before correct word alignment is determined.

Results from simulated error-free encoding and decoding of a 240,000 bit random binary sequence (10,000 30-bit data words, including parity bits) yielded 10,000 correct indications and 7056 false indications. Of the false indications, there were 375 adjacent word pairs, 39 triples, and 6 quadruples that all had 30-bit spacing between indications. The algorithm illustrated by FIG. 8 was used to process this sequence at every possible starting position (300,000-29). The histogram of FIG. 10 shows the number of bits that had to be examined before true word alignment was determined. Often, the correct word alignment could be determined after examining just one 30-bit sub-sequence. Occasionally, the correct word alignment could be determined after examining only 29 bits. This is possible when the first 29 bits examined do not show an alignment indication. In that event, bit 30 can be the only correct word boundary because the true indication cannot be missed, which is an assumption for the method of FIG. 8. However, on the average, 40 bits were examined before correct word alignment was determined. The GPS data rate is 50 bits/second so the average examination time was 0.8 seconds. The average time is the important parameter because asset battery life depends on this average.

The process of FIG. 9 is a simplified form of a more general 30-hypothesis test. As with any such test, the probability of declaring the wrong hypothesis is usually not zero, although it may be very small. The hypothesis test performance is often characterized by the achieved false and correct hypothesis-declaration probabilities. The false probability can be reduced, and the correct probability can be increased, by developing a more general hypothesis scoring scheme and, eventually, choosing the hypothesis with the highest score. The Sequential Probability Ratio Test (SPRT) and the Truncated SPRT are such hypothesis testing methods. For SNRs above a certain low threshold, performance of the SPRT can be made as good as desired by examining more data. Thus asset energy can be traded for synchronization accuracy.

Figure 11:
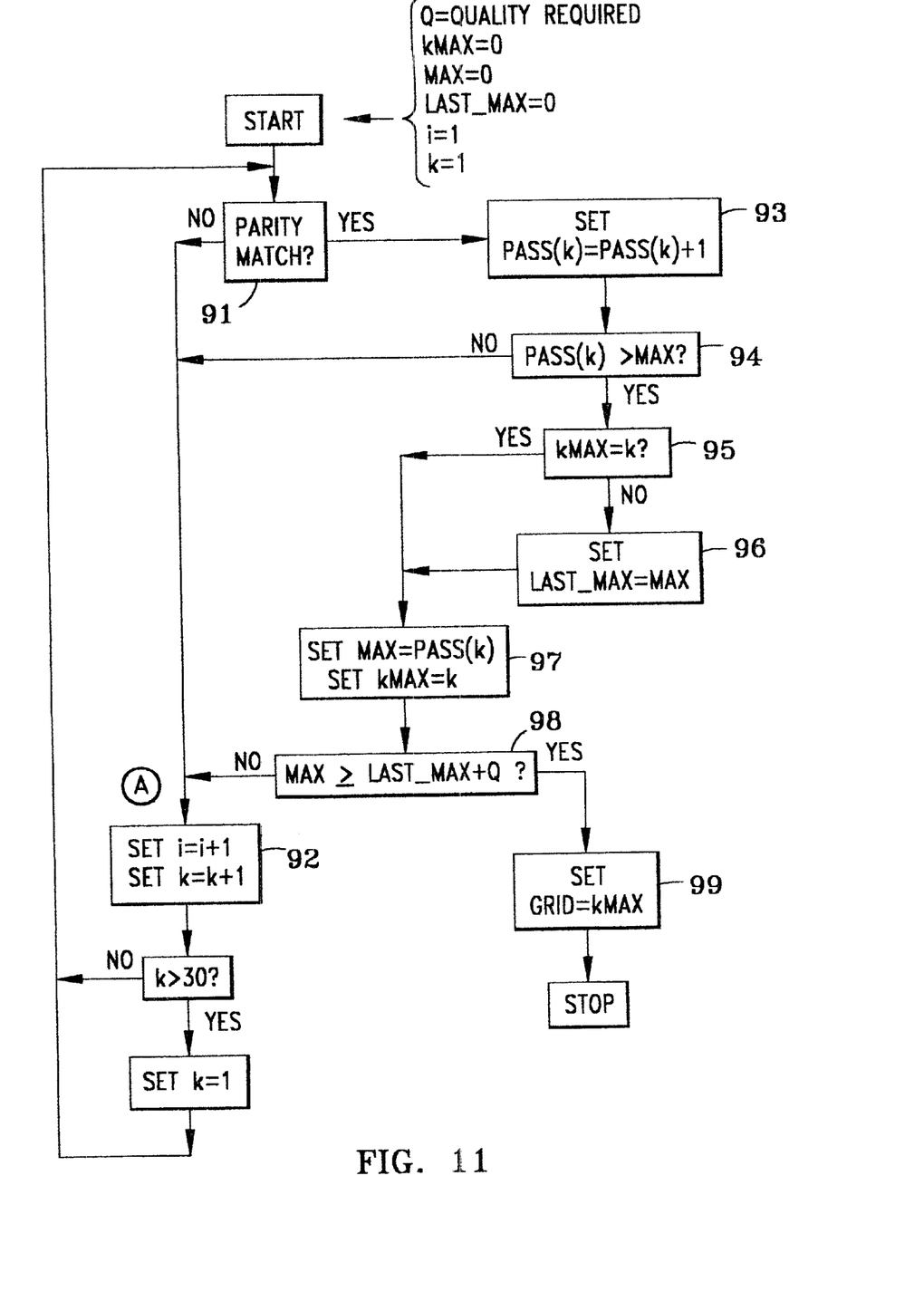
FIG. 11 is a flow diagram for an alignment-detection algorithm that allows for errors in the received data stream.

FIG. 11 is a flow chart for an alignment-detection algorithm that allows for errors in the received data stream. This is a modified version of the process shown in FIGS. 8 or 9. With this algorithm, the concept of "stale" is not used. Instead, each of the 30 possible alignment grids is associated with a "pass" score. Each 30-bit sequence in the received data stream is associated with only one alignment grid, and the pass score for the associated grid is increased by one if the parity check is correct (passes) for this sequence. After a sufficient number of 30-bit sequences have been processed, only one alignment grid will have the highest pass score if the receiver error rate is not too high. A grid is accepted to be the correct alignment grid of its pass score is substantially larger than the pass score of any other grid. To avoid repeated searching of all pass-score values, the largest and next-largest pass scores can be updated as the sliding 30-bit window is processed.

In the flow diagram of FIG. 11, the process is started by setting kmax, max, and last_max to 0 and setting i and k to 1. Again, i is the index of the first bit in the 30-bit window, and k is the index of the associated grid. Next is a test 91 to determine if the parity is valid (passes) for the 30-bit sequence. If not, the process proceeds to point A where, at step 92, i is incremented by one and k is incremented by one, modulo 30. If parity match is yes, pass (k) is incremented by one at step 93 and tested for pass (k)>max at step 94. If step 94 is no, the process goes to point A. If step 94 is yes, then pass (k) is the new largest pass score and the process updates max and kmax, and updates last_max at step 96 only if k is different from kmax as determined at step 95. Since the process has found a best grid, it next tests, at step 97 and 98, to determine if the new max is sufficiently larger (by required quality, Q) than last_max. If not, the process again proceeds to point A. If yes, then grid k is set as the alignment grid at step 99 and the process stops.

In other GPS tracking systems, an ambiguity is present due to possible data bit slips in each of the GPS signals with respect to the reference signal. On the surface of the earth, spacing of the ambiguous positions is never less than 1500 miles in any direction, so this is not a problem in many tracking applications. Nevertheless, this ambiguity can be completely eliminated by replacing the bit phase measurements with word phase measurements using the intermediate time grid.

While only certain preferred features of the invention have been illustrated and described, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letters Patent is as follows:

1. A method for implementing a signal processing system that lessens time error in a Global Positioning System (GPS) receiver while using a time clock that is predisposed to drift in the GPS receiver, said method comprising the steps of:

receiving, at the GPS receiver, sequences of data bits from a GPS satellite transmitter;

detecting candidate word-alignment positions in the received data bit sequences;

selecting one of said candidate word-alignment positions as being correct; and synchronizing the time clock with the time of transmission associated with the selected word-alignment position.

2. The method of claim 1 wherein the step of selecting one of said word alignment positions as being correct comprises the steps of:

examining one of said received data bit sequences to identify an alignment indication beginning with an arbitrarily assigned first bit;

repeating the step of examining one of said received data bit sequences, beginning with a bit subsequent to said first bit and continuing until all different ones of said data bit sequences have been examined;

for each repeated step of examining, checking the received data bit sequence extant thereat for a parity match and ignoring any alignment detection for which a calculated parity does not match a received parity; and providing, as an output signal, a bit position that aligns with word boundaries in the received data bits for which a parity check matches.

3. The method of claim 1 wherein the step of detecting a word alignment of received data bits comprises:

examining, for an alignment indication, an arbitrarily selected thirty successive ones of the received data bits beginning with a first bit (i=1); and repeating the step of examining thirty successive ones of the received data bits beginning with the second bit (i=2) and continuing through beginning with the thirtieth bit (i=30) until a unique correct alignment grid among the number of candidate grids (k=30) is established.

4. The method of claim 3 wherein the step of examining, for an alignment indication, an arbitrarily selected thirty successive ones of the received data bits comprises setting i=1, k=1 and the number of candidate grids to 30, and the step of repeating the step of examining thirty successive ones of the received data bits comprises:

a) examining for a parity match said arbitrarily selected thirty successive ones of the received data bits and eliminating the corresponding grid k=1 as being stale if calculated parity fails to match the received parity bits;

b) decreasing the candidate grid count by one; and c) repeating step (a) for each of the other grids (k=2 through k=30) and, as each grid is eliminated for failure of parity bit match, decreasing the count of candidate grids by 1 until only one grid is left that is not stale, whereby the one grid that remains aligned with boundaries of the word in the received data bits is accepted as being true.

5. The method of claim 3 including the steps of:

monitoring bit erasures at the receiver; and preventing elimination of any specific candidate grid if a bit erasure is detected within the 30 bit sequence being examined.

6. The method of claim 5 wherein the step of monitoring bit erasures at the receiver comprises monitoring received energy at the receiver in order to detect a drop in said received energy when an erasure occurs.

7. The method of claim 1 wherein the step of selecting one of said word alignment positions as being correct comprises the steps of:

examining one of said received data bit sequences to identify a word alignment indication beginning with an arbitrarily assigned first bit;

repeating the step of examining one of said received data bit sequences, beginning with a bit subsequent to said first bit and continuing until one word alignment grid position has occurred a number of times more often than all other candidate grid positions by a predetermined amount;

maintaining a score corresponding to the number of times each candidate grid position has occurred;

for each repeated step of examining, checking the received data bit sequence extant thereat for a parity match and increasing the score of any word alignment detections for which a calculated parity matches a received parity; and providing, as an output signal, a bit position that aligns with word boundaries in the received data bits for which the score is the highest and in excess of the score of the next highest word alignment detections by a predetermined quality criterion.

8. A method for implementing a signal processing procedure that lessens time error in a Global Positioning System (GPS) receiver carried on an asset whose position is to be monitored, said receiver including an asset clock that is predisposed to drift, said method comprising the steps of:

receiving, at the GPS receiver, sequences of data bits from a GPS satellite transmitter;

synchronizing the asset clock using periodic correlation every 30 bits in the signal received from said GPS satellite transmitter;

using said periodic correlation to establish an intermediate time grid with which all asset clock measurements and clock synchronizations are aligned;

keeping track of the absolute bit count and time associated with each intermediate grid point at both said asset and a central station; and limiting time measurements only to established intermediate grid points so as to allow the correct position of said asset to be calculated at said control station.

9. The method of claim 8 wherein said receiver is activated only when a position fix is needed.

10. A word alignment detector for use in a Global Positioning System (GPS) receiver carried on an asset where position is to be monitored, comprising:

a data shift register for receiving, serially, a stream of data bits transmitted from a GPS satellite, said stream of data bits including 6 parity bits;

a parity generator for producing a word segment comprised of parity bits;

a comparator responsive to said shift register and said parity generator for comparing the word segment produced by said parity generator with parity bits assumed to be stored in said shift register; and a word alignment indicator responsive to said comparator for producing an indication that the last data bit to enter the shift register is the end of a 30 bit data word whenever the parity bits assumed to be stored in the shift register form a word segment equal to the word segment of parity bits produced by the parity generator.

* * * * *